(12) United States Patent
Nishiguchi et al.

(10) Patent No.: US 9,426,352 B2
(45) Date of Patent: Aug. 23, 2016

(54) IMAGING APPARATUS, IMAGING METHOD, AND FOCUS CONTROL APPARATUS

(71) Applicant: HITACHI INDUSTRY & CONTROL SOLUTIONS, LTD., Ibaraki (JP)

(72) Inventors: Tomoaki Nishiguchi, Tokyo (JP); Hideharu Ono, Tokyo (JP); Iori Umezawa, Tokyo (JP); Toshiyuki Yokoyama, Yokohama (JP); Yukitoshi Shirota, Yokohama (JP); Toshifumi Inokuchi, Yokohama (JP)

(73) Assignee: Hitachi Industry & Control Solutions, Ltd., Ibaraki (JP)

( * ) Notice: Subject to any disclaimer, the term of this patent is extended or adjusted under 35 U.S.C. 154(b) by 0 days.

(21) Appl. No.: 14/557,577

(22) Filed: Dec. 2, 2014

(65) Prior Publication Data

US 2015/0215518 A1 Jul. 30, 2015

(30) Foreign Application Priority Data

Jan. 27, 2014 (JP) .................................. 2014-012082

(51) Int. Cl.
*H04N 5/262* (2006.01)
*H04N 5/232* (2006.01)

(52) U.S. Cl.
CPC ....... *H04N 5/23212* (2013.01); *H04N 5/23296* (2013.01)

(58) Field of Classification Search
CPC ............... G02B 7/282; H04N 5/23212; H04N 5/23296; G06T 7/0042
See application file for complete search history.

(56) References Cited

U.S. PATENT DOCUMENTS

| | | | | |
|---|---|---|---|---|
| 5,600,372 A * | 2/1997 | Cha | ......................... | G02B 7/102 348/345 |
| 2006/0033831 A1* | 2/2006 | Ejima | ................ | H04N 5/23216 348/333.01 |
| 2007/0211351 A1* | 9/2007 | Chi | .......................... | G03B 5/00 359/698 |
| 2009/0201410 A1* | 8/2009 | Nishiguchi | ........ | H04N 5/23212 348/345 |
| 2010/0123818 A1* | 5/2010 | Ono | .................... | H04N 5/23212 348/345 |

(Continued)

FOREIGN PATENT DOCUMENTS

JP 2006-023339 A 1/2006

*Primary Examiner* — Aung S Moe
*Assistant Examiner* — John H Morehead, III
(74) *Attorney, Agent, or Firm* — Mattingly & Malur, PC

(57) ABSTRACT

A focus control apparatus reduces the degree of out-of-focus of an image of an intense point light source during zooming in contrast-based autofocus control. A zooming lens moves in an optical axis direction to perform magnification change and a focusing lens moves in the optical axis direction to perform focus adjustment and is driven in accordance with a trace curve corresponding to the distance to a subject. A controller evaluates, during the magnification change operation, based on the rate of change in the number of high-luminance pixels at which the number of high-luminance pixels in an output image from the imaging apparatus changes with the zoom magnification, whether or not the focusing lens is driven in accordance with a trace curve corresponding to the distance to the subject before the magnification change operation is performed or a trace curve corresponding to a distance to the subject of infinity.

11 Claims, 12 Drawing Sheets

(56) References Cited

U.S. PATENT DOCUMENTS

| | | | |
|---|---|---|---|
| 2012/0060614 A1* | 3/2012 | Yoshida | H04N 5/772 73/649 |
| 2013/0201386 A1* | 8/2013 | Ohbuchi | H04N 5/23212 348/349 |
| 2013/0271611 A1* | 10/2013 | Morimoto | H04N 5/33 348/164 |
| 2014/0253783 A1* | 9/2014 | Springer | H04N 5/23212 348/347 |
| 2015/0036034 A1* | 2/2015 | Yatabe | H04N 5/347 348/302 |
| 2015/0189155 A1* | 7/2015 | Umezawa | H04N 5/23212 348/345 |
| 2015/0207982 A1* | 7/2015 | Umezawa | H04N 5/23212 348/353 |

\* cited by examiner

IMAGING APPARATUS, IMAGING METHOD, AND FOCUS CONTROL APPARATUS

BACKGROUND

1. Technical Field

The present invention relates to an imaging apparatus, an imaging method, and a focus control apparatus.

2. Related Art

Many imaging apparatus of related art, such as a monitoring camera and a video camcorder, have a built-in autofocus function that allows automatic focus adjustment. An example of a focusing method in an autofocus function of this type is a contrast-based focus adjustment method using a fact that the amplitude of a contrast signal provided from captured video images is maximized when the images are brought into focus.

In an imaging apparatus, when a focusing lens is moved along the optical axis thereof, captured video images are defocused or brought into focus and the amplitude of the contrast signal changes accordingly. In a most fundamental contrast-based method, the focusing lens is temporarily moved along the optical axis thereof, and a direction in which images are brought into focus is detected based on the magnitude of the amplitude of the contrast signal before and after the movement, followed by movement of the focusing lens in the detected direction.

An example of a background technology in the present technical field is JP-A-2006-023339. JP-A-2006-023339 describes "A digital camera 1A includes an evaluation section that evaluates based on image data whether or not a scene under imaging is a night scene. The evaluation section determines the scene under imaging is a night scene when a high-luminance portion is present in a first portion (such as AF area AR) that is a central portion of a framing region FR and a low-luminance portion is present in a second portion (such as hatched area MR) in the framing region" (see Abstract).

When an image of an intense light source, such as a headlight of an automobile and a street lamp, is captured, phenomenon in which the amplitude of the contrast signal is undesirably maximized in a false focus position where an in-focus state is not achieved occurs, as shown in FIG. 12.

FIG. 12 shows values of the contrast signal versus the focusing lens position in a case where a point light source is present in a subject. As, shown in FIG. 12, when a point light source is present in a subject, a false peak appears in some cases in a position shifted from a correct in-focus-position toward the Near side and/or in a position shifted from the correct in-focus position toward the Far side. Therefore, when a point light source is present, an effect of the false peak prevents in some cases the focusing lens from reaching the correct in-focus position where an image of the subject is brought into focus.

In autofocus control performed when a point light source is present, an out-of-focus state undesirably occurs during zoom-in or zoom-out operation because the effect of the false peak prevents the focusing lens from reaching the correct focus position. At nighttime, in particular, when a state in which an image of a wide-range scene is captured at a low magnification is changed to a state in which the registration plate of a car having headlights is zoomed in or to a state in which a subject close to a street lamp is zoomed in, it is conceivable that an out-of-focus state occurs.

JP-A-2006-023339 describes that the focusing lens is moved in advance to a position corresponding to infinity before an image of a night scene is captured. JP-A-2006-023339, however, does not disclose how to move the focusing lens in the following possible zooming operation, and an out-of-focus state may occur during the zooming operation when a point light source is present.

SUMMARY

The invention has been made in view of the points described above and proposes an imaging apparatus that reduces the degree of out-of-focus state of an image of a point light source during zoom-in or zoom-out operation in contrast-based autofocus control.

To solve the problem described above, the invention provides an imaging apparatus including a zooming lens that moves in an optical axis direction to perform magnification change operation and a focusing lens that moves in the optical axis direction to perform focus adjustment and driving the focusing lens in accordance with a trace curve corresponding to the distance to a subject, the imaging apparatus including a controller that evaluates, during the magnification change operation, based on the rate of change in the number of high-luminance pixels at which the number of high-luminance pixels in an output image from the imaging apparatus changes with the zoom magnification, whether or not the focusing lens is driven in accordance with a trace curve corresponding to the distance to the subject before the magnification change operation is performed.

According to the invention, an imaging apparatus that reduces the degree of out-of-focus state of an image of a point light source during zoom-in or zoom-out operation in contrast-based autofocus control can be provided.

BRIEF DESCRIPTION OF THE DRAWINGS

FIG. 6 shows the rate of increase in the number of high-luminance pixels versus the zoom magnification in a case where a high-luminance subject is zoomed in.

DESCRIPTION OF EXEMPLARY EMBODIMENTS

An example will be described below with reference to the drawings.

(1) Configuration of Imaging Apparatus According to Embodiment of Invention

Figure 1:
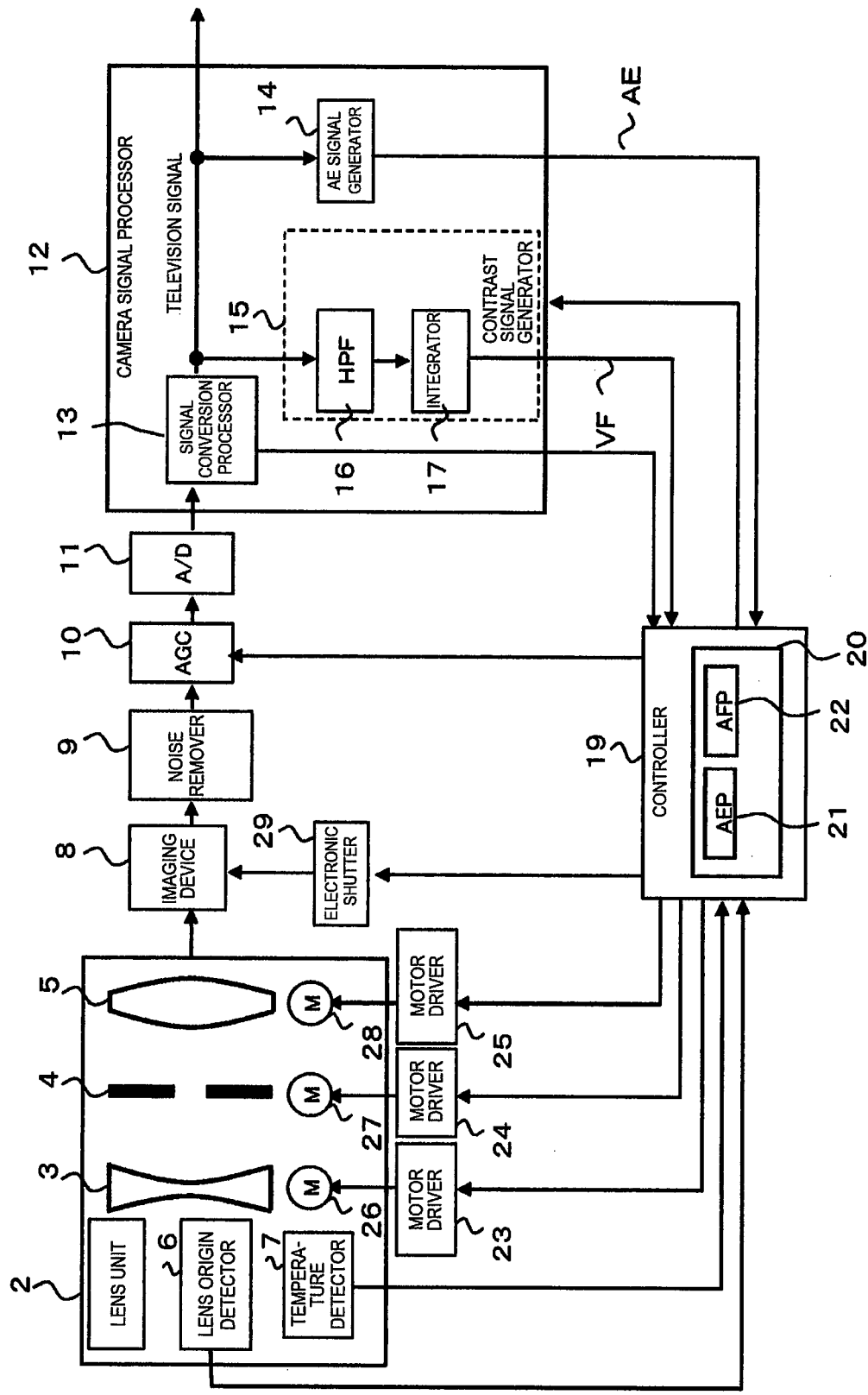
FIG. 1 is a configuration diagram of an imaging apparatus according to an embodiment of the invention.

FIG. 1 is a configuration diagram of an imaging apparatus 1 according to the present embodiment.

In the imaging apparatus 1, a lens unit 2 includes a variator lens group 3, which variably magnifies a light flux from a subject, an aperture 4, which adjusts the amount of received light, and a focusing lens group 5, which has a focus adjustment function.

The lens unit 2 is further provided with a lens origin detector 6, which is formed, for example, of a photo-interrupter, and a temperature detector 7. The lens origin detector 6 detects absolute positions of the variator lens group 3 and the focusing lens group 5 and transmits results of the detection as lens absolute position information to a controller 19 or an external system capable of communicating with the imaging apparatus 1. The temperature detector 7 detects the temperature in the lens unit 2 and transmits a result of the detection as in-lens-unit temperature information to the controller 19 incorporated in the imaging apparatus 1 or an external system capable of communicating with the imaging apparatus 1. The lens unit 2 still further includes motors 26 to 28, which drive the variator lens group 3, the aperture 4, and the focusing lens group 5, respectively. The motors 26 to 28 can be driven based on motor control signals from motor drivers 23 to 25, respectively.

An imaging device 8 then forms an optical image of a subject on a light receiving surface of the imaging device 8, which is formed, for example, of a CCD. The optical image of the subject formed on the light receiving surface is photoelectrically converted, and the resultant captured image signal is outputted to a noise remover 9. The noise remover 9 performs predetermined noise removal on the captured image signal, and the processed signal is then outputted to an automatic gain control circuit, (AGC: automatic gain controller) 10. The automatic gain control circuit 10 amplifies the captured image signal into a video signal having an optimum level, which is then outputted to an analog/digital conversion circuit (A/D) 11, where the video signal is converted into a digital signal, which is then outputted as a digital captured image signal to a camera signal processor 12.

The camera signal processor 12 includes a signal conversion processor 13, an AE (automatic exposure) signal generator 14, and a contrast signal generator 15. The signal conversion circuit 13 performs predetermined signal processing on the digital captured image signal inputted from the analog/digital conversion circuit (A/D) 11 to convert the digital captured image signal into a standard television signal that conforms to the NTSC (National Television Standards Committee) standard, the PAL (Phase Alternating Line) standard, or any other predetermined television scheme and outputs the converted signal to an external apparatus. Based on the inputted television signal, the AE signal, generator 14 generates an, automatic iris signal AE having a signal level according, for example, to the brightness of current captured video images, the degree of opening of the aperture 4 in the lens unit 2, and the gain of the automatic gain control and outputs the automatic iris signal AE to the controller 19.

The contrast signal generator 15, which is provided in the camera signal processor 12, is formed of an HPF (highpass filter) circuit 16 and an integrator 17. The HPF circuit 16 is capable of arbitrarily changing a value of a cutoff frequency, generates a contrast signal VF having a frequency lower than the arbitrary cutoff frequency, and outputs the contrast signal VF to the integrator 17. The integrator 17 integrates the inputted contrast signal VF and outputs a result of the integration to the controller 19. The contrast signal generator 15, which is formed of the HPF circuit 16 and the integrator 17, is capable of acquiring values from an arbitrary region of an output image.

The controller 19 includes a CPU (central processing unit), an internal memory 20, and other information processing resources (neither of them is shown). Based on an automatic iris data processing program (AEP) 21 and an autofocus data processing program (AFP) 22 stored in the internal memory 20, the controller 19 calculates an automatic iris evaluation value, which is an evaluation value associated with the brightness of current captured video images identified by the automatic iris signal AE, the degree of opening of the aperture 4 in the lens unit 2, the gain of the automatic gain control, and other factors, and acquires an autofocus evaluation value, which is a value of the contrast signal VF.

The controller 19 further detects an in-focus direction and an in-focus position based on the autofocus evaluation value, generates a third motor control signal based on a result of the detection, and sends the third motor control signal to the third motor driver circuit 25. The third motor driver circuit 25 thus drives and controls the third motor 28, which moves the focusing lens group 5 in the lens unit 2 in the direction of the optical axis thereof, based on the third motor control signal. Autofocus control is thus performed.

The controller 19 further generates first and second motor control signals based on the automatic iris evaluation value, zoom magnification information representing the current zoom magnification obtained based on the lens absolute position information from the lens origin detector 6, the in-lens-unit temperature information provided from the temperature detector 7, and trace curve data stored in the internal memory 20 and outputs the first and second motor control signals to the motor driver circuits 23 and 24, respectively. The motor driver circuit 23 thus drives and controls the motor 26, which moves the variator lens group 3 in the lens unit 2 in the direction along the optical axis thereof, based on the inputted first motor control signal. The motor driver circuit 24 drives and controls the second motor 27, which drives the aperture in the lens unit 2, based on the inputted second motor control signal. Automatic iris control is thus performed.

The controller 19 further controls the shutter speed of an electronic shutter 29 based on the automatic iris evaluation value in such a way that an exposure period for which the imaging device 8 is exposed to light increases or decreases to adjust the amount of light that forms an optical image of the subject formed on the light receiving surface of the imaging device 8 and performs gain adjustment in the automatic gain control circuit 10 based on the automatic iris evaluation value.

(2) Autofocus Control Method in Imaging Apparatus

In the autofocus function, when a zooming lens operates to change the magnification, the position of the focusing lens is automatically determined in accordance with a subject, and a formed image is always brought into focus. On the other hand, in a manual focus function, the position of the focusing lens is adjusted based on stored trace curve information, which represents the relationship between the zoom magnification and the amount of movement of the focusing lens.

Figure 2:
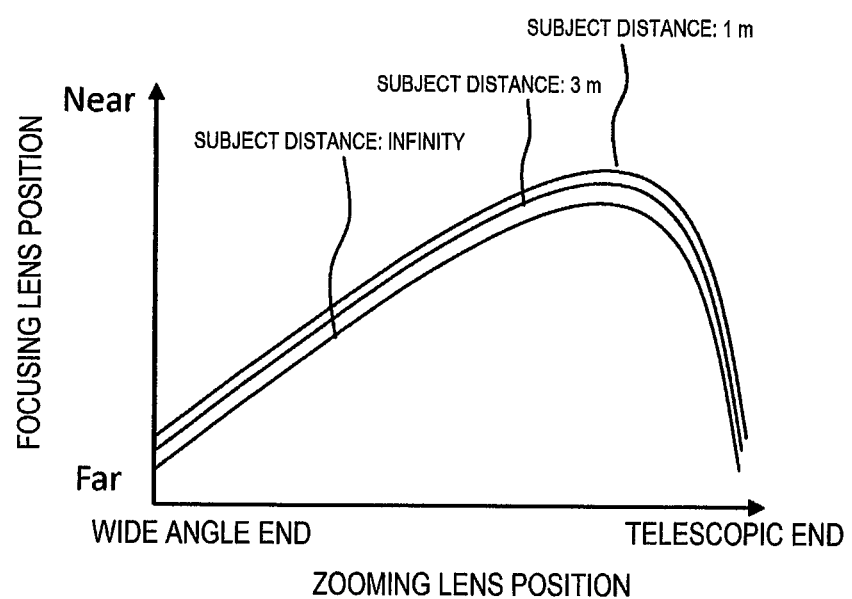
FIG. 2 shows examples of a zoom trace curve.

FIG. 2 shows examples of the zoom trace curve. In FIG. 2, the horizontal axis represents the position of the zooming lens 3, and the vertical axis represents the position of the focusing lens 5. FIG. 2 shows zoom, trace curves corresponding to subject distances of 1 m, 3 m, and infinity. When the zooming lens 3 is moved, the focusing lens 5 is moved in accordance with such a zoom trace curve to maintain an in-focus state. The subject distance of 1 m is typically longer than a minimum imaging distance.

Figure 3:
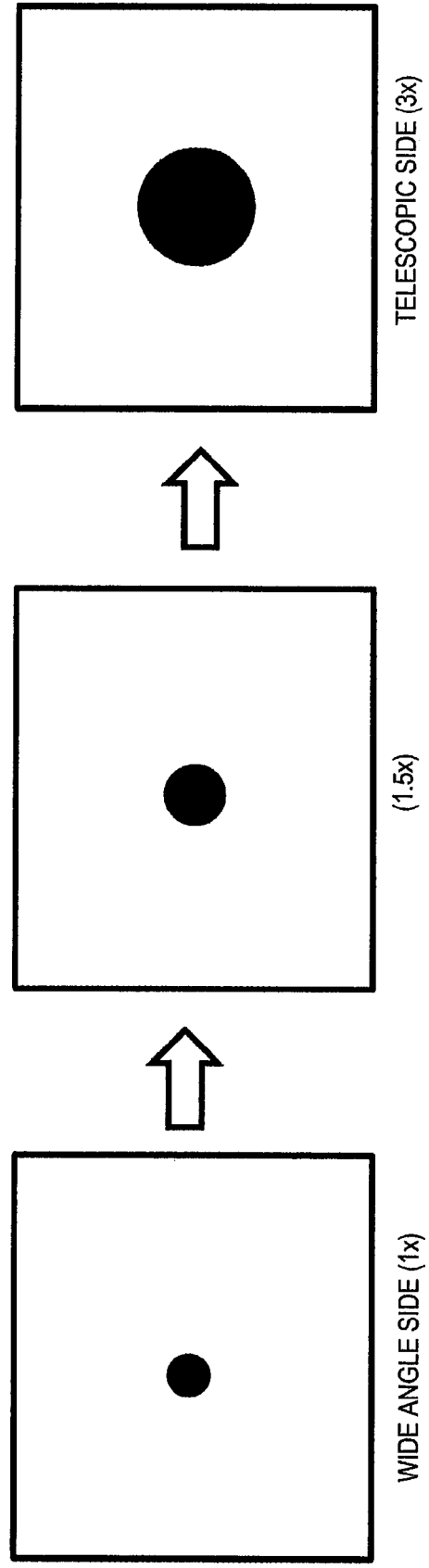
FIG. 3 shows output images in a case where a subject is zoomed in with images thereof maintained in-focus.
Figure 4:
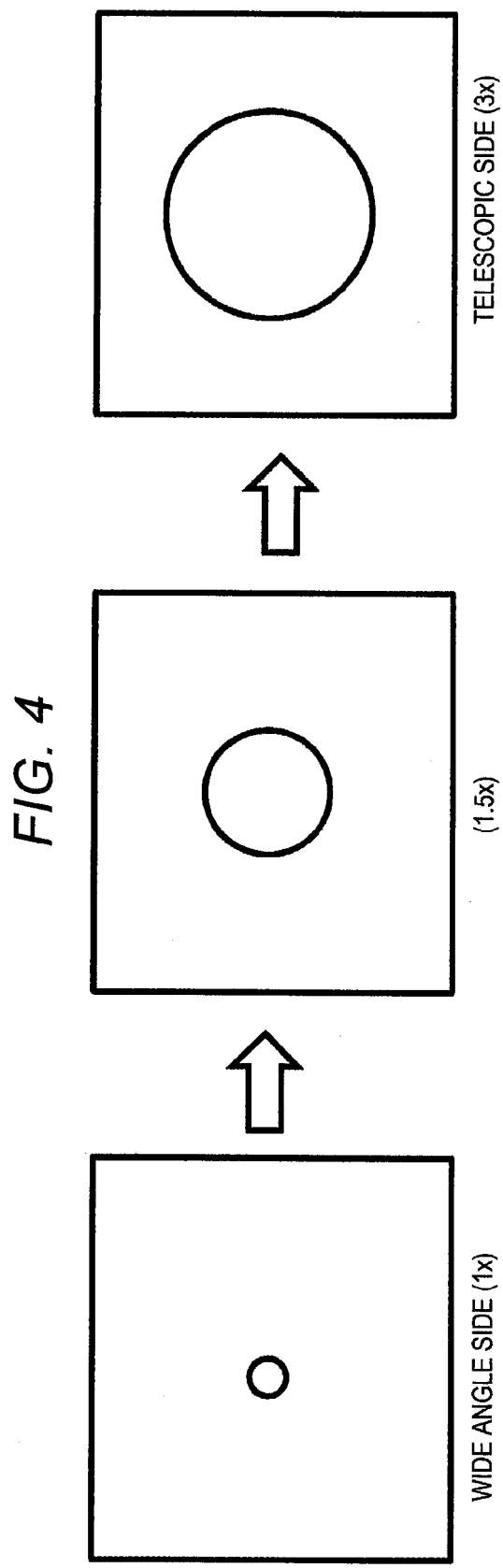
FIG. 4 shows output images in a case where the subject is zoomed in with images thereof maintained out-of-focus.

FIG. 3 shows output images in a case where a subject is zoomed in with images thereof maintained in-focus. FIG. 4 shows output images in a case where the subject is zoomed in with images thereof maintained out-of-focus. The filled circles in FIG. 3 represent the subject zoomed in with the in-focus state maintained, and the open circles in FIG. 4 represent the subject (subject containing high-luminance portion, in particular) zoomed in with the out-of-focus state maintained.

When the subject is zoomed in with the images thereof maintained in-focus, the subject is appropriately zoomed in in accordance with the zoom magnifications with no blur in the images of the subject, as shown in FIG. 3. On the other hand, in FIG. 4, since the subject is zoomed in with the images thereof maintained out-of-focus, the subject is not appropriately zoomed in in accordance with the zoom magnifications, and the number of high-luminance pixels increases, resulting in blurred images of the subject.

Figure 5:
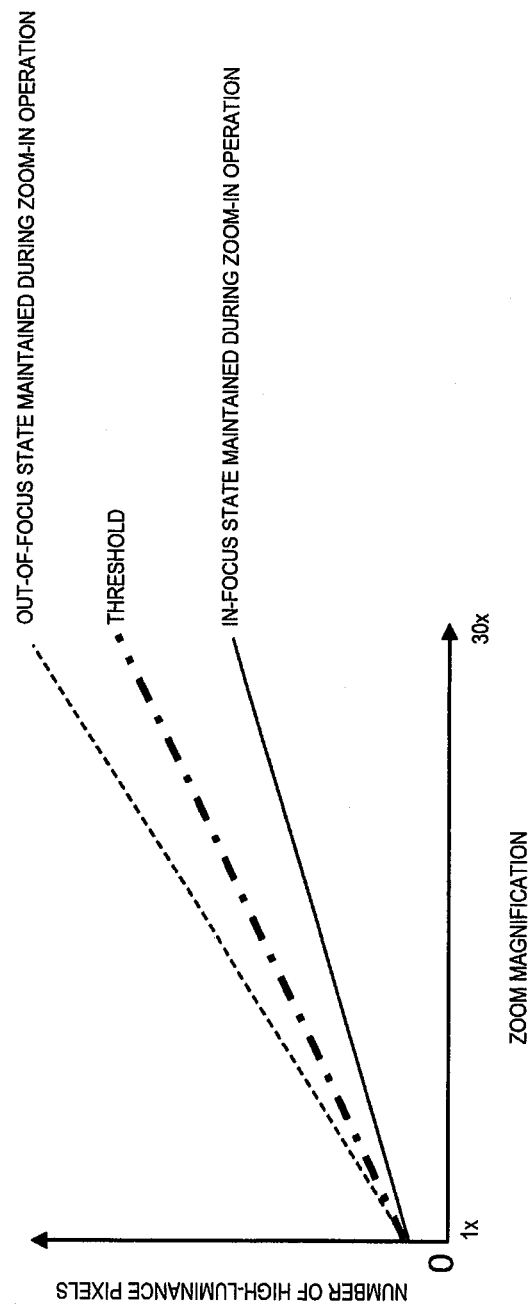
FIG. 5 shows the number of high-luminance pixels in an output screen versus zoom magnification.

FIG. 5 shows the number of high-luminance pixels in an output screen versus the zoom magnification in FIGS. 3 and 4. When the subject is zoomed in with an in-focus state maintained, the number of high-luminance pixels changes in an upward tendency as the zoom magnification increases, as indicated by the solid line. The dashed line represents a threshold of the number of high-luminance pixels at which an acceptable in-focus state is provided during the zoom-in operation. For example, along the dashed line, the number of high-luminance pixels changes in an upward tendency by an amount about 1.1 to 1.5 times the amount of increase in the number of high-luminance pixels in an in-focus state (solid line). On the other hand, when the subject is zoomed in with the images thereof maintained out-of-focus, the number of high-luminance pixels changes in an upward tendency as indicated by the dotted line in accordance with the absolute value of the number of high-luminance pixels greater than the threshold indicated by the dashed line. It is, however, noted that the number of high-luminance pixels does not necessarily increase in proportion to the zoom magnification, and the number of high-luminance pixels may change in any upward tendency.

Figure 6:
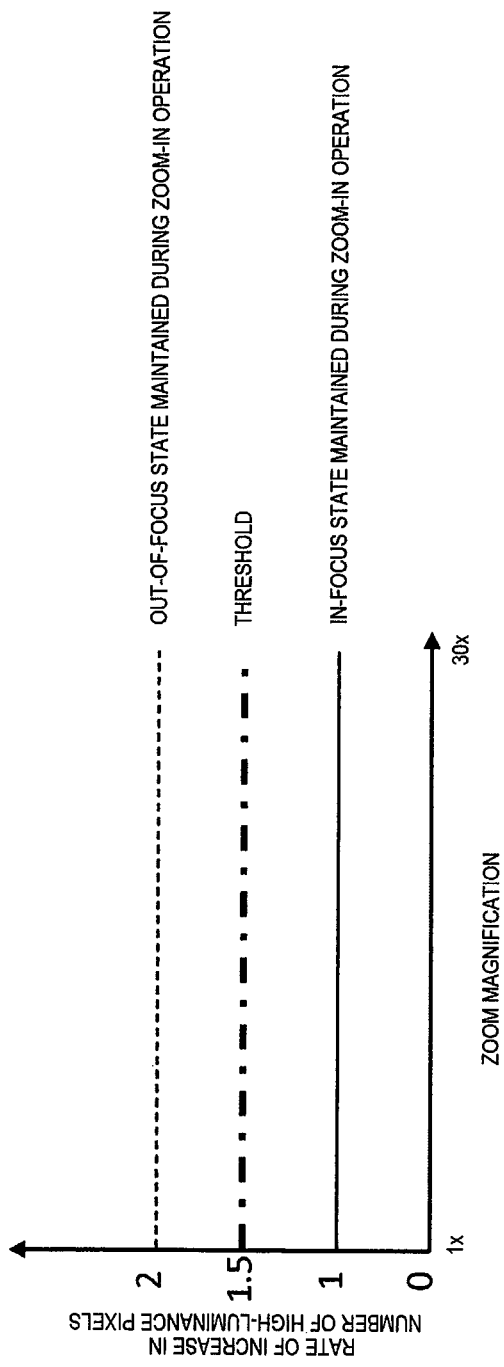

FIG. 6 shows the rate of increase in the number of high-luminance pixels versus the zoom magnification in a case where a high-luminance subject is zoomed in. The rate of increase in the number of high-luminance pixels can be expressed by the following Expression (1). That is, the rate of increase in the number of high-luminance pixels is the gradient of the increase in the number of high-luminance pixels in FIG. 5 versus the zoom magnification.

The rate of increase in the number of high-luminance pixels=the amount of increase in the number of high-luminance pixels/the amount of change in the zoom magnification  (1)

When an in-focus state is maintained during the zoom-in operation, the rate of increase in the number of high-luminance pixels is about 1, as shown in FIG. 6. On the other hand, when it is assumed that an increase rate at which an acceptable in-focus state is provided during zoom-in operation is about 1.5, and no in-focus state is achieved during the zoom-in operation, the increase rate is nearly equal to 2 beyond the threshold described above. That is, the greater the degree of out-of-focus state during the zoom-in operation, the greater the rate of increase in the number of high-luminance pixels. It is, however, noted that the rate of increase in the number of high-luminance pixels is not necessarily fixed versus the zoom magnification and may vary with the zoom magnification in some cases.

The above description has been made of the case where images of a high-luminance subject are blurred when the subject is zoomed in. When a high-luminance subject is zoomed out, images of the subject are blurred in the same manner.

Figure 7:
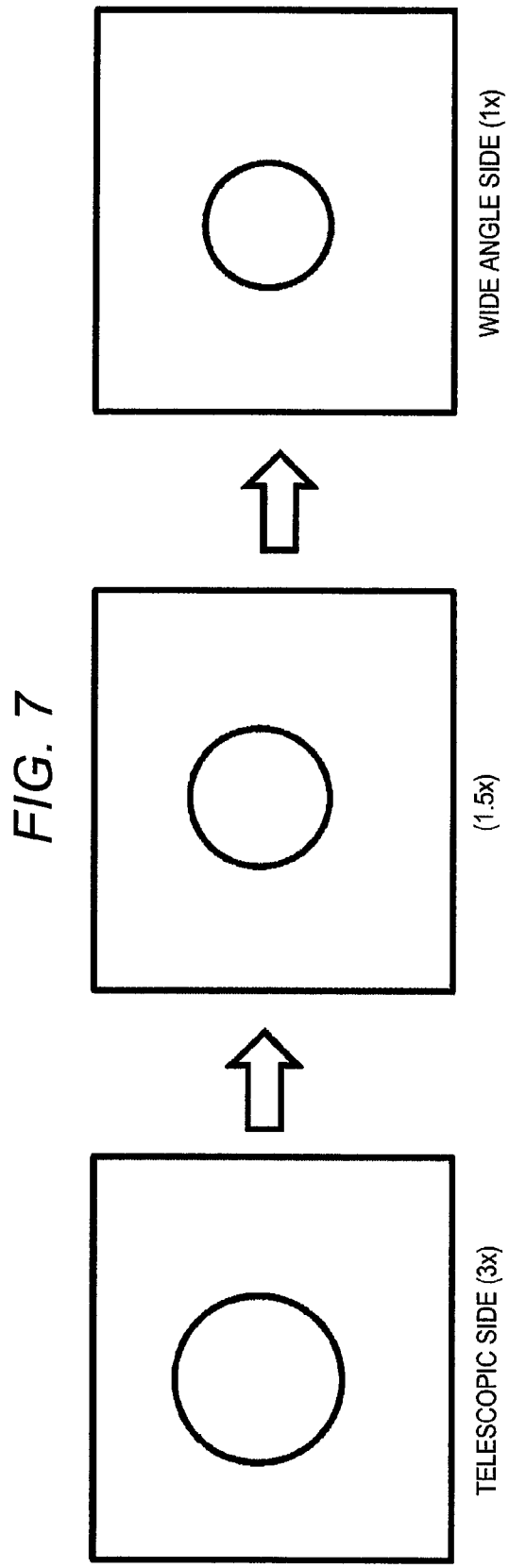
FIG. 7 shows output images in a case where a high-luminance subject is zoomed out with images thereof maintained out-of-focus.

FIG. 7 shows output images in a case where high-luminance subject is zoomed out with images thereof maintained out-of-focus. When the subject is zoomed out with images thereof maintained out-of-focus, the number of high-luminance pixels is greater than those in the subject at each zoom magnification as shown in FIG. 7, undesirably resulting in blurred images of the subject.

Figure 8:
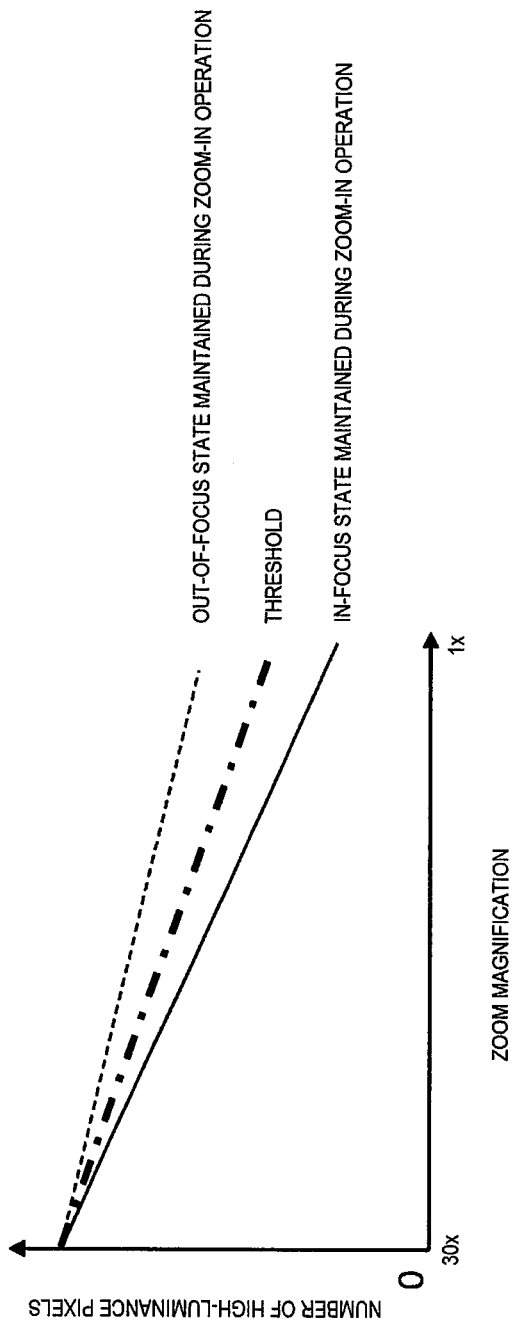
FIG. 8 shows the number of high-luminance pixels in the output screen versus the zoom magnification.

FIG. 8 shows the number of high-luminance pixels in the output screen versus the zoom magnification in FIG. 7. When the subject is zoomed out with an in-focus state maintained, the number of high-luminance pixels changes in a downward tendency as the zoom magnification decreases, as indicated by the solid line. The dashed line represents a threshold of the number of high-luminance pixels at which an acceptable in-focus state is provided during the zoom-in operation. For example, along the dashed line, the number of high-luminance pixels changes in a downward tendency by an amount about 0.90 to 0.66 times the amount of decrease in the number of high-luminance pixels in the in-focus state (solid line). On the other hand, when the subject is zoomed in with images thereof maintained out-of-focus, the number of high-luminance pixels changes in a downward tendency as indicated by the dotted line in accordance with the absolute value of the number of high-luminance pixels greater than the threshold indicated by the dashed line. It is, however, noted that the number of high-luminance pixels does not necessarily decrease in proportion to the zoom magnification, and the number of high-luminance pixels may change in any downward tendency.

Figure 9:
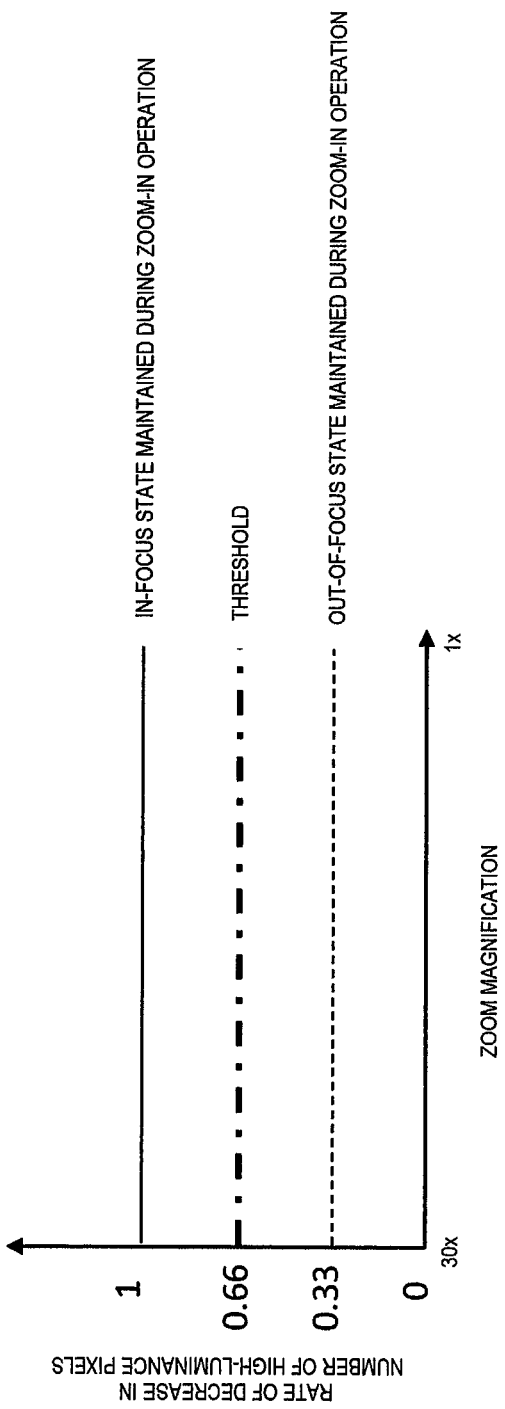
FIG. 9 shows the rate of decrease in the number of high-luminance pixels versus the zoom magnification in a case where a high-luminance subject is zoomed out.

FIG. 9 shows the rate of decrease the number of high-luminance pixels versus the zoom magnification in a case where a high-luminance subject is zoomed out. The rate of decrease in the number of high-luminance pixels can be expressed by the following Expression (2). That is, the rate of decrease in the number of high-luminance pixels is the gradient of the decrease in the number of high-luminance pixels in FIG. 8 versus the zoom magnification.

The rate of decrease in the number of high-luminance pixels=the amount of decrease in the number of high-luminance pixels/the amount of change in the zoom magnification  (2)

When an in-focus state is maintained during the zoom-out operation, the rate of decrease in the number of high-luminance pixels is about 1, as shown in FIG. 9. On the other hand, when it is assumed that a third threshold of the rate of decrease in the number of high-luminance pixels at which an acceptable in-focus state is provided during the zoom-in operation is about 0.66, and no in-focus state is achieved during the zoom-in operation, the decrease rate is nearly equal to 0.33, which is smaller than the threshold. That is, the greater the degree of out-of-focus state during the zoom-in operation, the smaller the rate of decrease in the number of high-luminance pixels. It is, however, noted that the rate of decrease in the number of high-luminance pixels is not necessarily fixed versus the zoom magnification and may vary with the zoom magnification.

In view of the facts described above, based on the number of high-luminance pixels versus the zoom magnification or the rate of increase and decrease in the number of high-luminance pixels versus the zoom magnification in a case where zoom-in or zoom-out operation is performed with no in-focus state achieved as described above, the present example is characterized by the following configuration:

That is in a case where during zoom-in operation, the number of high-luminance pixels or the rate of increase in the number of high-luminance pixels has a value greater than a threshold at which an acceptable in-focus state is provided, the controller 19 moves the focusing lens along a trace curve corresponding to the subject distance before the zoom-in operation or a trace curve corresponding to the subject distance of infinity. On the other hand, in a case where during zoom-out operation, the number of high-luminance pixels has a value greater than a threshold at which an acceptable in-focus state is provided or the rate of decrease in the number of high-luminance pixels has a value smaller than the threshold at which an acceptable in-focus state is provided, the controller 19 moves the focusing lens along a trace curve corresponding to the subject distance before the zoom-out operation or a trace curve corresponding to the subject distance of infinity. That is, under these conditions, since no in-focus state is achieved, the configuration in which the focusing lens is moved along a trace curve corresponding to the subject distance before the zoom-in or zoom-out operation in an in-focus state is employed. It is noted that when the zooming lens is in a position in the vicinity of the wide angle end, the subject distance cannot be accurately identified in some cases. In such cases, the subject distance is assumed to be infinity and the focusing lens is moved along the trace curve corresponding to the subject distance of infinity. When the imaging apparatus is used particularly in a monitoring application, moving the focusing lens under the assumption described above is advantageous because a subject is located at infinity in many cases.

Whether or not the zooming lens is being moved in zoom-in operation is determined by the controller 19 based on a user's instruction. Similarly, in a case where during zoom-out operation, the number of high-luminance pixels or the rate of decrease in the number of high-luminance pixels has a value smaller than a threshold at which an acceptable in-focus state is provided, the focusing lens is moved along a trace curve corresponding to the subject distance before the zoom-out operation or a trace curve corresponding to the subject distance of infinity. The number of high-luminance pixels may be acquired from an output image from the imaging apparatus (not shown) or may be acquired from the signal processor 13 and transmitted to the controller 19.

Action in the present example in a case where a subject containing a high-luminance portion is located at infinity will be described by way of example with reference to FIG. 10.

Figure 10:
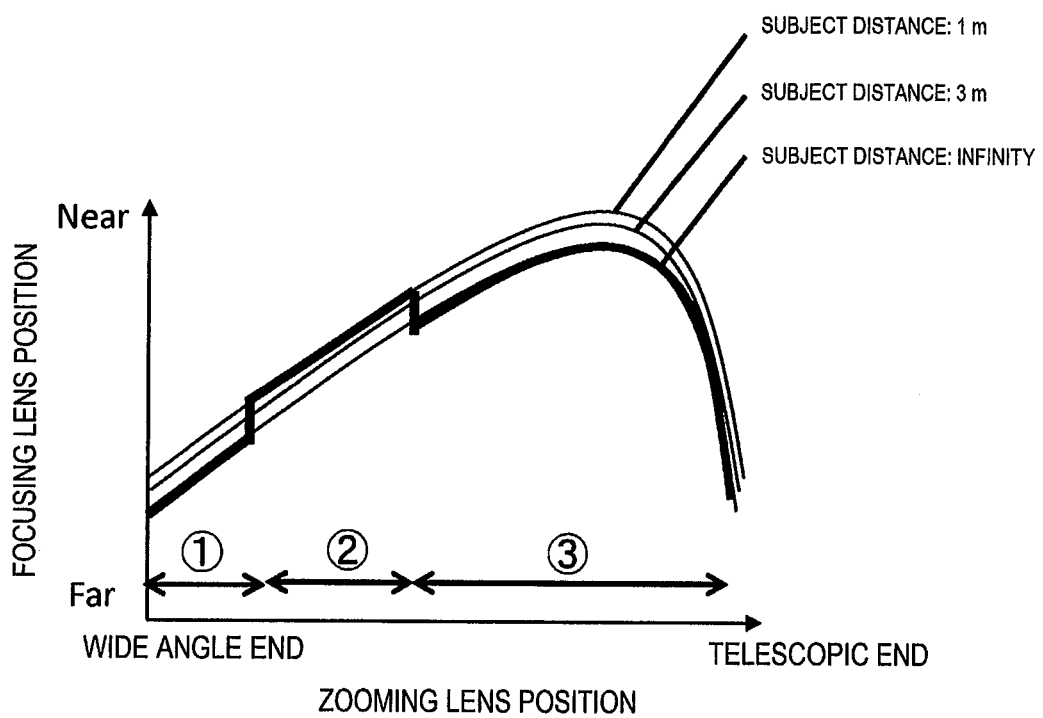
FIG. 10 describes action in a present example based on trace curves in a case where a subject containing a high-luminance portion is located at infinity before zoom-in operation by way of example.

FIG. 10 describes the action in the present example based on trace curves in a case where a subject containing a high-luminance portion is located at infinity before zoom-in operation by way of example.

Figure 12:
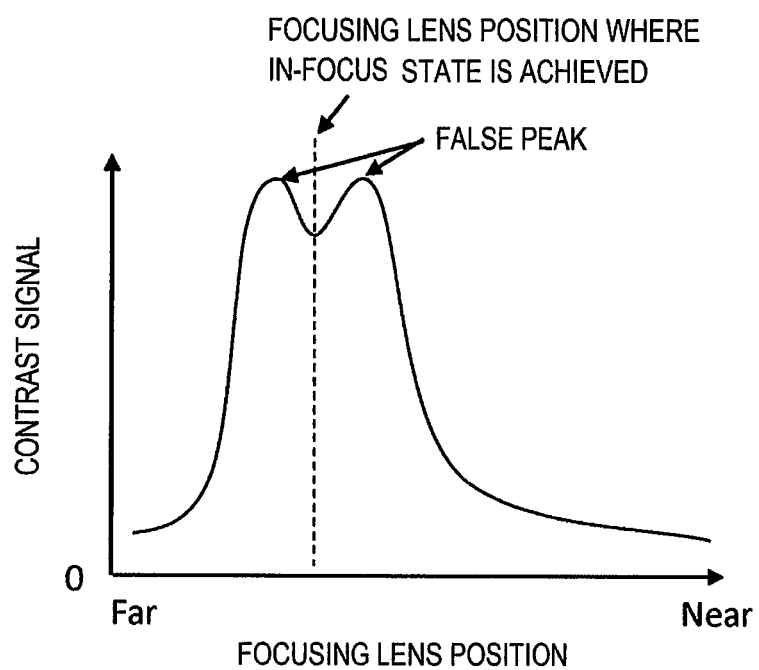
FIG. 12 shows values of a contrast signal versus the position of a focusing lens in a case where a point light source is present in a subject.

To bring an image of the subject containing a high-luminance portion into focus, the focusing lens is first moved based on the trace curve corresponding to the subject distance of infinity and the contrast signal (region (1)). When the focusing lens is then located due to the effect of a false peak of the contrast signal in a position different from an in-focus position where an in-focus state is achieved as described above with reference to FIG. 12, the focusing lens is moved based on the trace curve corresponding, for example, to the subject distance of 1 m (region (2)). At this point, the trace curve in accordance with which the focusing lens is moved does not always transition to the trace curve corresponding to the subject distance of 1 m but may transition to any trace curve other than the trace curve corresponding to the subject distance of infinity. In the region (2), where an out-of-focus state occurs, it is evaluated based, for example, on comparison between the rate of change in the number of high-luminance pixels and the threshold described above whether an out-of-focus state has occurred. When the evaluation result shows that an out-of-focus state has been occurred, the focusing lens is driven in accordance with the trace curve corresponding to the subject distance before the zoom-in operation or a trace curve corresponding to the subject distance of infinity (region (3)). It is, however, noted that in the region (3), the trace curve corresponding to the subject distance of 1 m is not necessarily caused to transition to the trace curve corresponding to the subject distance of infinity, and the trace curve may be caused to sequentially transition through the trace curves corresponding to the subject distances of 1 m, 3 m, and infinity and the focusing lens may be driven accordingly.

On the other hand, when a subject is not located at infinity, simply moving the focusing lens along the trace curve corresponding to the subject distance of infinity after evaluation of the rate of change in the number of high-luminance pixels or any other factor may cause blur during zoom-in operation. The same holds true for zoom-out operation. To prevent the blur from occurring, the position of the focusing lens where an in-focus state was achieved manually or automatically before the zoom-in or zoom-out operation and the period for which the focusing lens has stayed in the in-focus position are stored the storage device 20. The controller 19 then evaluates whether or not the focusing lens is located in a position corresponding to infinity (subject is located at infinity) based on thresholds associated with the position and the period. When the evaluation result shows that the focusing lens is located in a position corresponding to infinity (subject is located at infinity), the controller 19 evaluates whether the number of high-luminance pixels or the rate of change in the number of high-luminance pixels is equal to, greater than, or smaller than the corresponding threshold. When the evaluation result shows that an out-of-focus state has occurred, the controller 19 evaluates whether or not the focusing lens is moved along the trace curve corresponding to the subject distance of infinity. On the other hand, when the focusing lens is located in a closer position from the position corresponding to infinity (subject is located in a closer position from infinity), the controller 19 determines that not only an image of a far scene but also a near scene are possibly captured, evaluates the rate of change in the number of high-luminance pixels, and performs contrast-based autofocus control instead of carrying out the process of moving the focusing lens along the trace curve corresponding to the subject distance of infinity. Instead, the controller 19 drives the focusing lens based on a trace curve corresponding to the above-mentioned focusing lens position stored in the storage device 20. Moving the focusing lens as described above allows control according to the subject distance before zoom-in or zoom-out operation to be performed, whereby the degree of out-of-focus state can be lowered.

Figure 11:
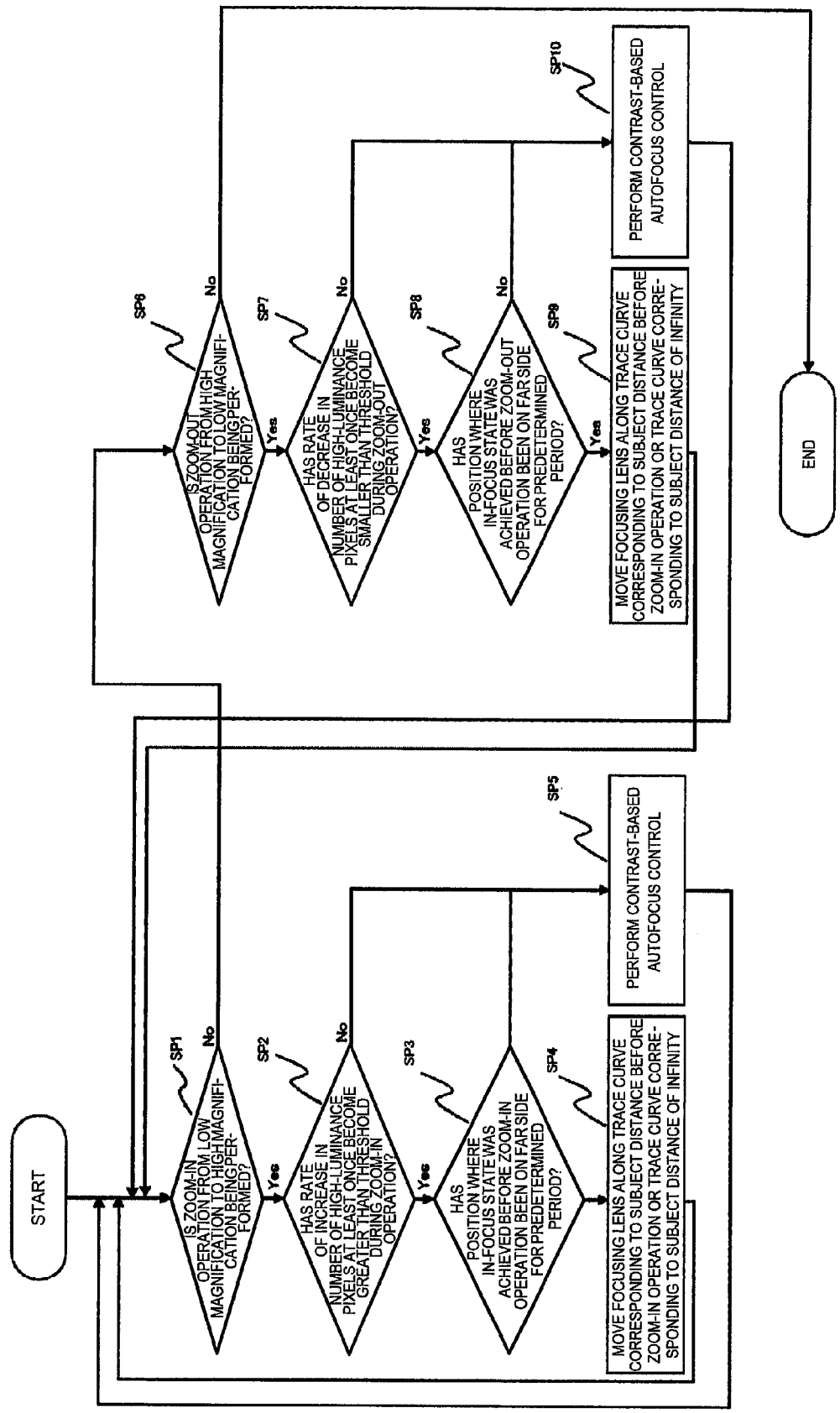
FIG. 11 is a flowchart for describing an autofocus control process according to the present embodiment in a case where a subject is located at infinity.

FIG. 11 is a flowchart for describing the autofocus control process in the present embodiment.

The controller 19 carries out the focus control process based on the autofocus control program 22 stored in the internal memory 20.

When the imaging apparatus is powered on, the controller 19 first starts the focus control process and evaluates whether zoom-in operation from a low magnification to a high magnification is being performed (SP1). When the evaluation result shows that the zoom-in operation is not being performed (No in SP1), the control proceeds to SP6, which will be described later.

When the evaluation result shows that the zoom-in operation is being performed (Yes in SP1), the control proceeds to SP2, where the controller 19 evaluates whether the rate of increase in the number of high-luminance pixels has at least once become greater than a first threshold during the zoom-in operation (SP2). The evaluation of whether or not the increase rate has become greater than the threshold is not necessarily made based on one occurrence and may be made based on an arbitrarily set number of occurrences. Further, the evaluation of whether or not the increase rate has become greater than the threshold can be made, for example, for each frame.

When the increase rate has become at least once greater than the threshold during the zoom-in operation (Yes in SP2), the controller 19 evaluates whether the position of the focusing lens where an in-focus state was achieved before the zoom-in operation has been on the far side (for example, the subject distance is 3 m or longer in a case where the imaging apparatus is used in a monitoring application) for a predetermined period (SP3). When the evaluation result in SP3 shows that the lens has been located in a position shifted from a predetermined position toward the far side for the predetermined period (Yes in SP3), the control proceeds to SP4. In SP4, the focusing lens is moved along a trace curve corresponding to the subject distance before the zoom-in operation, or the focusing lens is moved along the trace curve corresponding to the subject distance of infinity. The action of the focusing lens along an appropriate trace curve described above may be continued until the zoom-in operation is terminated, or the control may return to SP1 for each predetermined frame and the steps described above may be carried out again. As described above, driving the focusing lens in accordance with the trace curve until the zoom-in operation is terminated allows the zoom-in operation to be performed with an in-focus state reliably achieved. When the evaluation result in SP3 shows that the lens has not been located in a position shifted from the predetermined position toward the far side for the predetermined period (No in SP3) the control proceeds to SP5. In SP5, normal contrast-based autofocus control is performed (SP5).

Referring back to SP2, when the increase rate has not become greater than the first threshold (No in SP2), the controller 19 determines that no zoom-in operation has been performed in an out-of-focus state, and the control proceeds to SP5, where normal contrast-based autofocus control is performed (SP5). In this process, the zoom-in operation may be performed based not only on the focusing lens position stored in the internal memory 20 where an in-focus state was achieved manually or automatically during a period other than the zoom-in operation but also on a trace curve and a contrast value. Further, the contrast-based autofocus control may be continued until the zoom-in operation is terminated, or the control may return to SP1 for each predetermined frame and the steps described above may be carried out again.

When the evaluation result in SP1 is N, the control proceeds to SP6, where the controller 19 evaluates whether zooming operation from a high magnification to a low magnification (zoom-out operation) is being performed (SP6).

When the evaluation result shows that the zoom-out operation is being performed (Yes in SP6), the control proceeds to SP7, where the controller 19 evaluates whether the rate of decrease in the number of high-luminance pixels has at least once become smaller than a threshold during the zoom-out operation (SP7). When the decrease rate has at least once become smaller than the threshold during the zoom-out operation (Yes in SP7), the controller 19 evaluates whether the position of the focusing lens where an in-focus state was achieved before the zoom-out operation has been on the far side (for example, the subject distance is 3 m or longer when the imaging apparatus is used in a monitoring application) for a predetermined period (SP8). When the evaluation result in SP8 shows that the lens has been located in a position shifted from a predetermined position toward the far side for the predetermined period (Yes in SP8), the control proceeds to SP9. In SP9, the focusing lens is moved along a trace curve corresponding to the subject distance before the zoom-in operation, or the focusing lens is moved along the trace curve corresponding to the subject distance of infinity. The action of the focusing lens along an appropriate trace curve described above may be continued until the zoom-in operation is terminated, or the control may return to SP1 for each predetermined frame and the steps described above may be carried out again. As described above, driving the focusing lens in accordance with the trace curve until the zoom-out operation is terminated allows the zoom-out operation to be performed with an in-focus state reliably achieved. When the evaluation result in SP8 shows that the lens has not been located in a position shifted from the predetermined position toward the far side for the predetermined period (No in SP8), the control proceeds to SP10. In SP10, normal contrast-based autofocus control is performed (SP10). In this process, the zoom-in operation may be performed based not only on the focusing lens position stored in the internal memory 20 where an in-focus state was achieved manually or automatically during a period other than the zoom-in operation but also on a trace curve and a contrast value. Further, the contrast-based autofocus control may be continued until the zoom-in operation is terminated, or the control may return to SP1 for each predetermined frame and the steps described above may be carried out again.

What is claimed is:

1. An imaging apparatus including a zooming lens that moves in an optical axis direction to perform a magnification change operation and a focusing lens that moves in the optical axis direction to perform focus adjustment and the focusing lens is driven in accordance with a trace curve corresponding to the distance to a subject, the imaging apparatus comprising:

a controller, having a central processing unit coupled to a memory storing data of a trace curve corresponding to a distance to the subject before the magnification change operation is performed and data of a trace curve corresponding to a distance to the subject located at infinity, that evaluates, during the magnification change operation, based on a rate of change in a number of high-luminance pixels at which the number of high-luminance pixels in an output image from the imaging apparatus changes with the zoom magnification, whether or not the focusing lens is driven by a motor in accordance with the curve corresponding to the distance to the subject before the magnification change operation is performed or the trace curve corresponding to the distance to the subject located at infinity, wherein when the magnification change operation is a zoom-in operation from a low magnification to a high magnification, the rate of change in the number of high-luminance pixels at which the number of high-luminance pixels in an output image from the imaging apparatus changes with the zoom magnification is compared with a threshold, and when the rate of change in the number of high-luminance pixels is greater than the threshold, the focusing lens is moved in accordance with the trace curve corresponding to the distance to the subject before the magnification change operation is performed or the trace curve corresponding to the distance to the subject located at infinity.

2. The imaging apparatus according to claim 1,
wherein when the magnification change operation is a zoom-out operation from a high magnification to a low magnification, the rate of change in the number of high-luminance pixels at which the number of high-luminance pixels in an output image from the imaging apparatus changes with the zoom magnification is compared with a threshold, and when the rate of change in the number of high-luminance pixels is smaller than the threshold, the focusing lens is moved in accordance with the trace curve corresponding to the distance to the subject before the magnification change operation is performed or the trace curve corresponding to the distance to the subject located at infinity.

3. The imaging apparatus according to claim 1,
wherein the controller evaluates, based on the number of high-luminance pixels in an output image from the imaging apparatus instead of the rate of change in the number of high-luminance pixels, whether or not the focusing lens is driven in accordance with the trace curve corresponding to the distance to the subject before the magnification change operation is performed or the trace curve corresponding to the distance to the subject located at infinity.

4. The imaging apparatus according to claim 1,
wherein the threshold is the rate of change in the number of high-luminance pixels at the zoom magnification at which a predetermined in-focus state of the subject is provided.

5. The imaging apparatus according to claim 3,
wherein the threshold is the number of high-luminance pixels that allows a predetermined in-focus state of the subject to be provided.

6. The imaging apparatus according to claim 1,
wherein the rate of change in the number of high-luminance pixels is the amount of change in the number of high-luminance pixels divided by the amount of change in the zoom magnification.

7. The imaging apparatus according to claim 1,
when the controller determines that the focusing lens is driven in accordance with the trace curve corresponding to the distance to the subject before the magnification change operation is performed or the trace curve corresponding to the distance to the subject located at infinity, the focusing lens is driven in accordance with the trance curve until the zooming operation is terminated.

8. The imaging apparatus according to claim 1,
wherein the rate of change in the number of high-luminance pixels or the number of high-luminance pixels is not acquired based on an output image from the imaging apparatus but is acquired based on a video signal from a signal conversion processor that performs signal processing on a video signal provided from an imaging device in the imaging apparatus.

9. An imaging method for an imaging apparatus including a controller having a central processing unit coupled to a memory storing data of a trace curve corresponding to a distance to the subject before the magnification change operation is performed and data of a trace curve corresponding to a distance to the subject located at infinity, a zooming lens that moves in an optical axis direction to perform magnification change operation and a focusing lens that moves in the optical axis direction to perform focus adjustment and for driving the focusing lens in accordance with one of the data of the trace curve corresponding to a distance to the subject before the magnification change operation is performed and data of the trace curve corresponding to a distance to the subject located at infinity, the method comprising:

evaluating, during the magnification change operation, based on a rate of change in a number of high-luminance pixels at which the number of high-luminance pixels in an output image from the imaging apparatus changes with the zoom magnification, whether or not the focusing lens is driven by a motor in accordance with the trace curve corresponding to the distance to the subject before the magnification change operation is performed or the trace curve corresponding to the distance to the subject located at infinity, wherein when the magnification change operation is a zoom-in operation from a low magnification to a high magnification, the rate of change in the number of high-luminance pixels at which the number of high-luminance pixels in an output image from the imaging apparatus changes with the zoom magnification is compared with a threshold, and when the rate of change in the number of high-luminance pixels is greater than the threshold, the focusing lens is moved in accordance with the trace curve corresponding to the distance to the subject before the magnification change operation is performed or the trace curve corresponding to the distance to the subject located at infinity.

10. A focus control apparatus including a zooming lens that moves in an optical axis direction to perform magnification change operation and a focusing lens that moves in the optical axis direction to perform focus adjustment and the focusing lens is driven in accordance with a trace curve corresponding to the distance to a subject, the focus control apparatus comprising:

a controller, having a central processing unit coupled to a memory storing data of a trace curve corresponding to a distance to the subject before the magnification change operation is performed and data of a trace curve corresponding to a distance to the subject located at infinity, that evaluates, during the magnification change operation, based on a rate of change in a number of high-luminance pixels at which the number of high-luminance pixels in an output image from an imaging apparatus changes with the zoom magnification, whether or not the focusing lens is driven by a motor in accordance with the trace curve corresponding to the distance to the subject before the magnification change operation is performed or the curve corresponding to the distance to the subject located at infinity, wherein when the magnification change operation is a zoom-in operation from a low magnification to a high magnification, the rate of change in the number of high-luminance pixels at which the number of high-luminance pixels in an output image from the imaging apparatus changes with the zoom magnification is compared with a threshold, and when the rate of change in the number of high-luminance pixels is greater than the threshold, the focusing lens is moved in accordance with the trace curve corresponding to the distance to the subject before the magnification change operation is performed or the trace curve corresponding to the distance to the subject located at infinity.

11. The imaging apparatus according to claim 3,
wherein the rate of change in the number of high-luminance pixels or the number of high-luminance pixels is not acquired based on an output image from the imaging apparatus but is acquired based on a video signal from a signal conversion processor that performs signal processing on a video signal provided from an imaging device in the imaging apparatus.

* * * * *